United States Patent

[11] 3,623,999

[72] Inventors Harald Juntgen;
Joachim Karweil; Dieter Zundorf, all of Essen, Germany
[21] Appl. No. 864,274
[22] Filed Sept. 29, 1969
[45] Patented Nov. 30, 1971
[73] Assignee Bergwerksverband GmbH
Essen, Germany
[32] Priority Oct. 1, 1968
[33] Germany
[31] P 18 00 238.5

[54] PROCESS OF MAKING A BALL-SHAPED ADSORPTION COKE
14 Claims, 1 Drawing Fig.
[52] U.S. Cl. .................................................. 252/421,
252/445, 201/5, 201/8, 201/23, 201/38, 201/44
[51] Int. Cl. .................................................. C01b 31/08
[50] Field of Search ........................................ 201/7, 8, 5,
6, 21, 23, 32, 36, 38; 252/421, 445; 208/46

[56] References Cited
UNITED STATES PATENTS
1,530,393  3/1925  Morrell ........................ 252/421

| | | | |
|---|---|---|---|
| 2,648,637 | 8/1953 | Rodman........................ | 252/421 |
| 2,765,266 | 10/1956 | Throop et al. ................ | 201/21 X |
| 2,808,370 | 10/1957 | Bowers......................... | 201/23 X |
| 2,824,790 | 2/1958 | Gregory et al. ............... | 201/5 X |
| 3,009,863 | 11/1961 | Angevine ..................... | 201/6 UX |
| 3,043,753 | 7/1962 | Destremps et al. ........... | 201/7 X |
| 3,483,134 | 12/1969 | Olson ........................... | 201/6 X |
| 3,533,961 | 10/1970 | Voet............................. | 252/421 |

Primary Examiner—Norman Yudkoff
Assistant Examiner—David Edwards
Attorney—Michael S. Striker ABSTRACT: A carbonaceous material of a grain size below 100 $\mu$ is mixed with a reversibly softening binding agent at a temperature above the softening point of the binding agent and in the presence of water or water vapor. There results a doughy mass which is comminuted to the desired grain size. The comminuted material is then subjected to a preliminary low temperature carbonization followed by carbonizing or coking the material and then activating it.
The process permits obtaining of small size substantially ball-shaped adsorption coke in a highly economical manner.

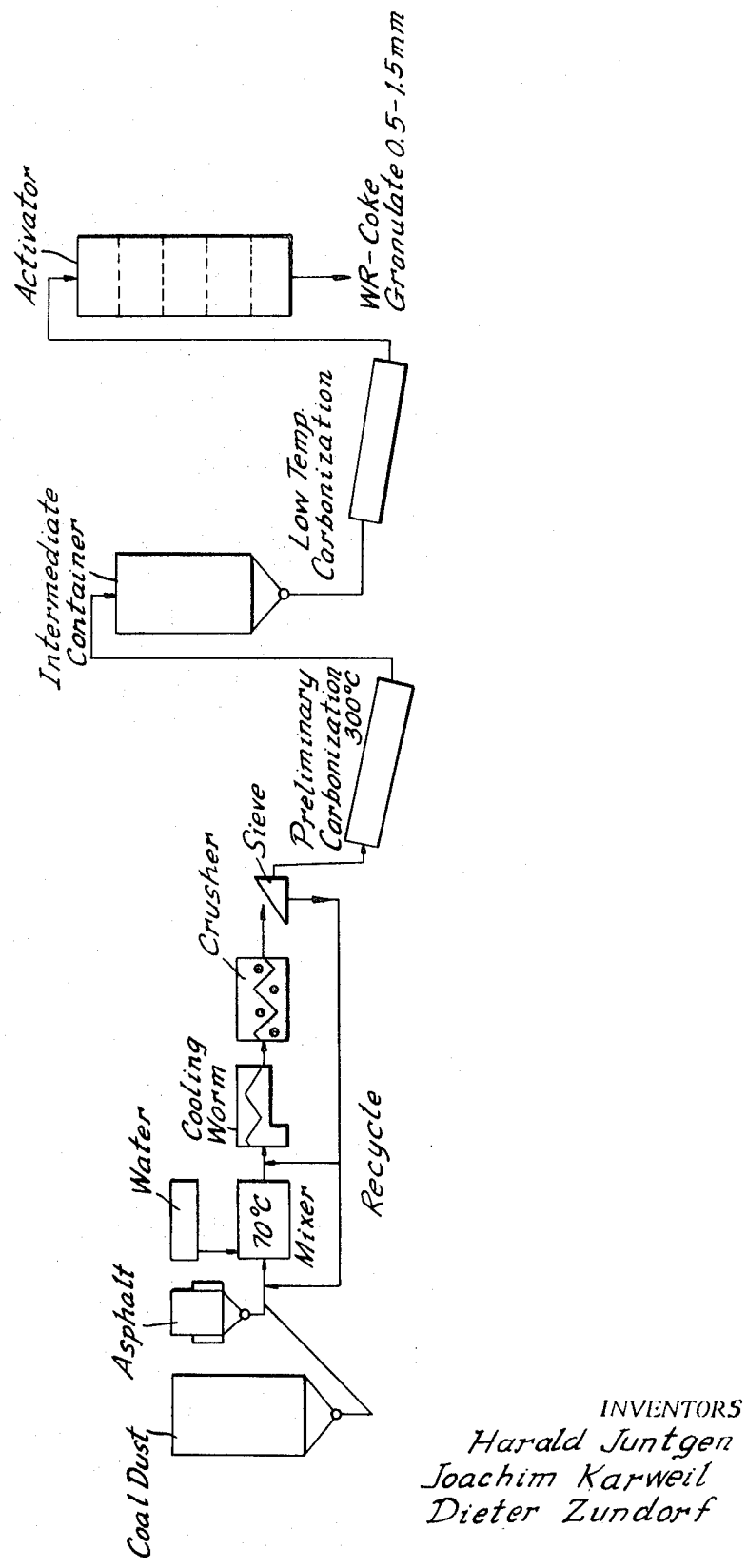
INVENTORS
Harald Juntgen
Joachim Karweil
Dieter Zundorf

PROCESS OF MAKING A BALL-SHAPED ADSORPTION COKE

BACKGROUND OF THE INVENTION

The invention relates to a process of making a substantially ball-shaped adsorption coke of small diameter.

Cokes of this type, particularly of a diameter not above 3 mm. are in great demand and specifically for adsorption processes in the liquid phase because the adsorption speed increases with decreasing diameter of the coke particles and ball-shaped adsorption agents have a comparatively low flow resistance.

Fine grain size activated carbon materials have already been made by subjecting finely ground specific kind carbonaceous material to a pressing operation so as to form small shapes followed subsequently by an activation step. However, these shaping processes are quite laborious and expensive if a very small diameter of the shapes is wanted. The manufacture of ball-shaped adsorption cokes with a grain diameter of, for instance, below 3 mm. by these methods is not economical.

The present invention therefore has the object to provide for a process that is economical and can be practiced on an industrial scale and leads to an adsorption coke of almost ball-shaped and with an extremely small diameter.

SUMMARY OF THE INVENTION

This object is met by a process as illustrated in the figure comprising the following steps:

The carbonaceous material of a grain size below 100$\mu$ is mixed with a reversibly softening binding agent at a temperature above the softening point of the binding agent and in the presence of water or water vapor;

The resulting doughy mass is then cooled and the mass is comminuted to the desired grain size;

The material is then subjected to a preliminary low temperature coking step at about 100° to 300° C. followed subsequently by carbonizing or coking the precoked material and if desired subjecting it to an activating treatment.

DESCRIPTION OF THE PREFERRED EMBODIMENTS

By the process of the invention it is possible to obtain substantially ball-shaped adsorption cokes of a grain diameter up to 3 mm. and preferably between 1 and 2 mm.

The binding agent may be a soft pitch, a hard pitch, or a petroleum bitumen.

The preliminary coking is preferably carried out in a rotary tube furnace.

The cooling may be effected during or subsequent to the comminution of the doughy mass, and is preferably carried out in cooled conveyor screws.

The substandard sizes that may be obtained during the comminution can be recirculated into the initial mass for a subsequent run.

The coke products of the invention do not have a particularly high adsorption property but are eminently suited as filter material. The activated coal products are in the form of a pearl-shaped, pourable activated carbon of high quality.

It is quite obvious that the hot mixture of carbonaceous material and reversibly softening binding agent such as pitch forms a doughy mass which yields its heat only slowly. Therefore if left to spontaneous cooling the mass will reach the desired brittleness necessary for comminution only after days. This difficulty which was quite apparent in developing the invention can be overcome by cooling the doughy mass either during or after the mechanical comminution in the form of bars or rods or flat layers; in other words, the mass is subjected to an intense cooling after or during a substantial enlargement of its surface. Good results are obtained, for instance, by forcing the doughy mass through refrigerated conveyor screws or refrigerated rollers, thus making use of an apparatus which at the same time accomplishes a broad distribution of the doughy mass and a good cooling throughout its thickness.

The necessary brittleness of the doughy mass can usually be accomplished by cooling the mass to a temperature at least 30° C. below the softening point of the binding agent. A cooling to a temperature substantially further requires a higher investment in the operational equipment but increases the desired property of brittleness of the initially doughy material so as to accomplish a high degree of comminution.

The grain size of the pearl-shaped final product depends on the degree of comminution and the sifting of the mass that has turned brittle during the cooling step. The process can be adjusted to obtain a mean grain size of 0.5 mm., 1 mm., 2 or 3 mm. It may, however, just as well be adjusted to result in a general grain size range, for instance between 2 and 3 mm. However, in all cases there will be obtained a certain amount of undersized grain which, as has already been indicated, can be recirculated into the mixer in view of its binding contents. It is possible in this manner to attain the desired grain size range at 100 percent yield.

The comminution may be effected, for instance, with crushers, disc or hammer mills. A preferred embodiment provides for the comminution already in the last quarter length of the cooling screw. This can, for instance, be carried out by increasing the pitch of the screw in that area and diminishing its diameter.

In the temperature range between 100° and 300° C. a softening of the grains of the particular grain size fraction is obtained to an extent that because of the revolving movement of the furnace the grains adopt a more or less ball-shaped form. It is surprising that during this process no caking together occurs of the grains. This preliminary carbonization can be effected at a uniform temperature, for instance of 250° C. or a slightly rising temperature may be used, for instance with a temperature increase from 150° to 300° C. Depending on the temperature, the preliminary carbonization should be terminated after between about 15 and 60 minutes, and preferably between about 20 and 40 minutes, since at that time the balls have gained a desired hardness.

The initial mixture for making the ball-shaped grains can easily be effected by adding about 10 to 30 percent by weight of binding agent and about 10 to 30 percent by weight of water or water vapor to the carbonaceous material. In case of a higher contents of binding material, a caking of the grains in the revolving tube furnace occurs which prevents obtaining a ball-shaped coke. When using smaller amounts of binding agent the cokes will have an inadequate hardness and will only partially result in a ball-shaped material.

The carbonization or coking of the precarbonized material is the same as the conventional carbonization or coking and since the precarbonized material can easily be moved, the final carbonization or coking can be carried out later in any conventional carbonization or coking furnace by heating to about 600° to 900° C. upon exclusion of air. However, the coking may also be carried out directly subsequent to the preliminary coking in the rotary furnace.

The subsequent activation can likewise be effected in a rotary tube furnace. Because of the narrow grain range of the resulting coke it is, however, preferred to effect the activation in a fluidizing bed. The activation agents may, as usual, be steam, carbon dioxide or sulfur dioxide.

As initial material it is preferred to use carbonaceous matters which do not swell strongly when heated. Particularly suitable are, therefore, anthracite, lean coal, forge coal, open burning coal and lignite, and also cokes that have been made from peat, wood or coal. In addition, there can be used also coking mineral coal after it has lost its coking property after an air treatment at a temperature between 100° and 300° C. The following examples will further illustrate the invention:

EXAMPLE I 80 weight parts of anthracite of a grain size below 0.1 mm. were kneaded in a mixer after adding 20 weight parts of pitch (softening point 52° to 56° C. by the Crämer-Sarnow method)

and 25 weight parts of water for a period of 3 minutes at a temperature of 65° C. The doughy mass was then forced through a screw which was subjected to strong cooling at its exit end. The cooled brittle fragments which came out of the screw were then fractured in a jawbreaker down to a grain size between 1 and 2 mm. The yield of this grain size was about 53 weight percent. The undersized grain was recirculated into the mixer for the next run.

The grain size between 1 and 2 mm. was heated by passing it through a tubular rotary furnace having a mean heating ratio of 10° C./min. to a final temperature of 900° C. while excluding air from the furnace. The mass was then activated in a connected fluidizing bed at 950° with steam until a firing loss of 24.1 weight percent was obtained. 98 percent of the resulting activated carbon consisted of a uniform, very hard and almost round grain material of a mean diameter between 1 and 2 mm.

EXAMPLE 2

85 weight parts of charcoal of a size below 0.1 mm. were intimately mixed with 15 weight parts of petroleum bitumen (softening point from 46° to 52° C.) in a steam kneader at a temperature of 75° C. The doughy mass was then placed on refrigerated rollers and formed into brittle ribbons and the material after cooling to 10 percent was then comminuted to a grain size between 2 and 3 mm. in a hammer mill.

This grain size fraction was then passed into a tubular rotary furnace operated at 250° C. with a throughput time of 60 minutes. The pearl-shaped product was then heated in a rinsing gas low temperature distillation retort which had a mean heating ratio of 30° C./min. and a final temperature of 700° C. This product had excellent filter properties. A subsequent activation with steam at 850° to a firing loss of 24.0 weight percent resulted in an activated carbon of which 97 percent consisted of almost round grains of a diameter between 2 and 3 mm.

EXAMPLE 3

A rich coal of a grain size below 0.1 mm. was treated in a fluidizing bed with air at 210° C. for a period of 2 hours. 80 weight parts of this oxidized coal were intimately mixed with 20 weight parts of a hard pitch (softening point between 70° and 75° C.) and 25 weight parts of water in a kneader which had been heated to 85°, the mixing taking place during a period of 10 minutes. The doughy mass was then passed through a refrigerated double screw which had an increased pitch in the last quarter of its length. At the screw exit there was obtained a grain fragment material of which by filtration a yield of 78 percent was obtained in the form of a grain range between 1.5 and 3 mm. The material was then passed through a tubular rotary furnace operated at a temperature of 280° C. with a resistance time of 30 minutes and was subsequently subjected to coking in a connecting tubular rotary furnace having a final temperature of 900° C. This material had excellent filter properties. An activation in a fluidizing bed with $CO_2$ resulted in a pearl-shaped activated carbon of high quality.

What we claim is:

1. The process of making a substantially ball-shaped adsorption coke comprising the steps of mixing a carbonaceous material having a grain size below 100µ with a reversibly softening binding agent in the presence of water at a temperature above the softening point of the binding agent but below the boiling point of water, cooling the resulting doughy mass and comminuting the same to the desired grain size, thereafter subjecting the comminuted material to a preliminary low temperature carbonization at about 100° to 300° C. in a rotary furnace and carbonizing or coking the resultant material and thereafter subjecting the coke material to an activation treatment.

2. The process of claim 1, wherein the preliminary carbonization is effected in a tubular rotary furnace.

3. The process of claim 1, wherein the binding agent is a soft pitch, a hard pitch or a petroleum bitumen.

4. The process of claim 1, wherein the comminution and subsequent treatment is selected to limit the grain size of the ball-shaped coke to a maximum of 3 mm.

5. The process of claim 1, wherein the cooling is effected during or subsequent to the mechanical comminution of the doughy mass.

6. The process of claim 1, wherein the cooling and comminution are effected in refrigerated conveyor screws.

7. The process of claim 1, wherein substandard size grain obtained during the comminution is recirculated for further use in the next run into the initial mixture.

8. The process of claim 1, wherein the preliminary carbonization is effected during a period between 15 and 60 minutes.

9. The process of claim 1, wherein the preliminary carbonization is effected during a time between 20 and 40 minutes.

10. The process of claim 1, wherein the binding agent and water are added to the carbonaceous material in an amount of between 10 and 30 weight percent, each, relative to the weight of the carbonaceous material.

11. The process of claim 1, wherein the cooling is effected to a temperature at least 30° C. below the softening point of the binding agent.

12. The process of claim 1, wherein the final carbonization and coking is effected at a temperature between 600° and 900° C. upon exclusion of air.

13. The process of claim 1, wherein the material resulting from the preliminary coking has a pearl-shaped size.

14. The process of claim 1, wherein said mixing is carried out at a temperature of 65° to 75° C.

* * * * *